US012456244B2

(12) United States Patent
Hutton et al.

(10) Patent No.: US 12,456,244 B2
(45) Date of Patent: Oct. 28, 2025

(54) AUTONOMOUS ANIMATION IN EMBODIED AGENTS

(71) Applicant: SOUL MACHINES LIMITED, Auckland (NZ)

(72) Inventors: Jo Hutton, Auckland (NZ); Mark Sagar, Auckland (NZ); Amy Wang, Auckland (NZ); Hannah Clark-Younger, Auckland (NZ); Kirstin Marcon, Auckland (NZ); Paige Skinner, Auckland (NZ); Shane Blakett, Auckland (NZ); Teah Rota, Auckland (NZ); Tim Szu-Hsien Wu, Auckland (NZ); Utkarsh Saxena, Auckland (NZ); Xueyuan Zhang, Auckland (NZ); Hazel Watson-Smith, Auckland (NZ); Travers Biddle, Auckland (NZ); Emma Perry, Auckland (NZ)

( * ) Notice: Subject to any disclaimer, the term of this patent is extended or adjusted under 35 U.S.C. 154(b) by 224 days.

(21) Appl. No.: 18/199,126

(22) Filed: May 18, 2023

(65) Prior Publication Data

US 2023/0377238 A1    Nov. 23, 2023

Related U.S. Application Data

(63) Continuation of application No. PCT/IB2021/060793, filed on Nov. 22, 2021.

(30) Foreign Application Priority Data

Nov. 20, 2020    (NZ) .......................................  770193

(51) Int. Cl.
G06T 13/40    (2011.01)
G06F 40/117    (2020.01)
(Continued)

(52) U.S. Cl.
CPC ............ *G06T 13/40* (2013.01); *G06F 40/284* (2020.01); *G06F 40/117* (2020.01);
(Continued)

(58) Field of Classification Search
None
See application file for complete search history.

(56) References Cited

U.S. PATENT DOCUMENTS

| 10,586,369 | B1 | 3/2020 | Roche et al. |
| 2015/0134652 | A1* | 5/2015 | Lee ...................... G06F 16/951 707/730 |
| 2018/0359448 | A1* | 12/2018 | Harries ................ G06Q 10/101 |

OTHER PUBLICATIONS

Yoon Youngwoo et al., "Robots Learn Social Skills: End-to-End Learning of Co-Speech Gesture Generation for Humanoid Robots," 2019 International Conference on Robotics and Automation (ICRA), pp. 4303-4309, May 2019.

(Continued)

*Primary Examiner* — Kee M Tung
*Assistant Examiner* — Biao Chen
(74) *Attorney, Agent, or Firm* — MARSHALL, GERSTEIN & BORUN LLP

(57) ABSTRACT

Embodiments described herein relate to the autonomous animation of Gestures by the automatic application of animations to Input Text—or the automatic application of animation Mark-up wherein the Mark-up triggers nonverbal communication expressions or Gestures. In order for an Embodied Agent's movements to come across as natural and human-like as possible, a Text-To-Gesture Algorithm (TTG Algorithm) analyses Input Text of a Communicative Utterance before it is uttered by a Embodied Agent, and marks it up with appropriate and meaningful Gestures given the meaning, context, and emotional content of Input Text and the gesturing style or personality of the Embodied Agent.

6 Claims, 8 Drawing Sheets

(51) Int. Cl.
*G06F 40/211* (2020.01)
*G06F 40/242* (2020.01)
*G06F 40/284* (2020.01)
*G06F 40/30* (2020.01)

(52) U.S. Cl.
CPC .......... *G06F 40/211* (2020.01); *G06F 40/242* (2020.01); *G06F 40/30* (2020.01); *G06T 2213/12* (2013.01)

(56) References Cited

OTHER PUBLICATIONS

Extended European Search Report dated Aug. 13, 2024.

\* cited by examiner

| Sentiment | Positive | 0.8 |
|---|---|---|
| | Negative | 0.8 |
| | Emphasis | 0.5 |
| Part of Speech | Superlative | 0.9 |
| | Comparative | 0.85 |
| | Adverb | 0.8 |
| | Adjective | 0.75 |
| | Verb | 0.65 |
| | Noun | 0.65 |
| | Pronoun | 0.5 |
| | Preposition | 0.55 |
| | After Preposition | 0.65 |
| | After Determiner | 0.65 |
| Miscellaneous | Capital/proper noun | 0.55 |
| | Word rareness | 0.85 |
| | Long | 0.65 |
| | Last Word | 0.55 |
| | Negation | 0.9 |

| Input text | John | | loves | | Snorkeling | | In | | Greece | |
|---|---|---|---|---|---|---|---|---|---|---|
| Scores | Raw (R) | Weighted (WT) | R | WT | R | WT | R | WT | R | WT |
| Rules | | | | | | | | | | |
| Word Sentiment (0.8) | 0 | 0 | 0.8 | 0.64 | 0 | 0 | 0 | 0 | 0 | 0 |
| Word Rareness (0.85) | 0.7 | 0.59 | 0.2 | 0.17 | 0.75 | 0.64 | 0.05 | 0.04 | 0.35 | 0.29 |
| Word Emphasis (0.9) | 0.5 | 0.45 | 0.6 | 0.54 | 0.5 | 0.45 | 0.1 | 0.09 | 0.5 | 0.45 |
| Word Negation (0.9) | 0 | 0 | 0 | 0 | 0 | 0 | 0 | 0 | 0 | 0 |
| Capital Words (0.55) | 1 | 0.55 | 0 | 0 | 1 | 0.55 | 0 | 0 | 1 | 0.55 |
| Part Of Speech (0.8) IN : 0.1 PRON : 0.5 VB : 0.65 NN : 0.65 JJ : 0.75 | 0.7 | 0.56 | 0.65 | 0.52 | 0.65 | 0.52 | 0.1 | 0.08 | 0.7 | 0.56 |
| Max | | 0.59 | | 0.64 | | 0.64 | | 0.09 | | 0.56 |

FIGURE 4

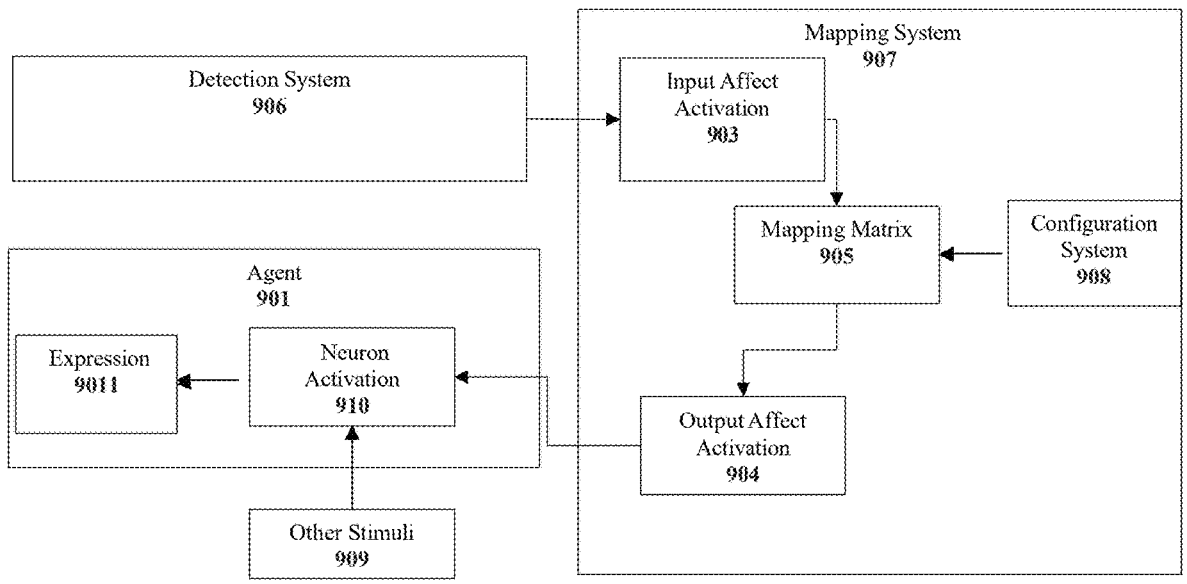

FIGURE 9

```
"user_speech_emotions": {
  "weights": {
    "anger": {"anger": 0.25, "concern": 0.5, "fear": 0.25, "shame": 0.2, "joy": -0.5},
    "concern": {"concern": 0.45, "sad": 0.3, "joy": -0.5},
    "disgust": {"concern": 0.4, "disgust": 0.4, "joy": -0.5},
    "fear": {"concern": 0.25, "fear": 0.75, "sad": 0.4, "joy": -0.5},
    "sad": {"concern": 0.45, "sad": 0.52, "joy": -0.5},
    "happy": {"joy": 0.75, "surprise": 0.1, "interest": 0.2, "excite": 0.15},
    "surprise": {"surprise": 0.6, "interest": 0.2},
    "interest": {"joy": 0.1, "surprise": 0.25, "interest": 0.4, "excite": 0.2}
  },
```

FIGURE 10

| Output Affect Activation | Input Affect Activation | | | | | | | surprise |
|---|---|---|---|---|---|---|---|---|
| | anger | concern | disgust | fear | sadness | happiness | surprise | |
| anger | 0.3 | | | | | | | |
| concern | 0.2 | 0.4 | 0.45 | 0.3 | 0.4 | | | |
| disgust | | | 0.5 | | | | | |
| fear | 0.2 | | | | | | | |
| sadness | | | | | | | | 0.1 |
| joy | -0.3 | 0-.3 | -0.2 | -0.3 | 0.7 | | 0.1 | 0.3 |
| surprise | | | | | | 0.2 | 0.45 | 0.3 |
| interest | 0.1 | | | | 0.2 | 0.2 | 0.4 | 0.4 |
| shame | | | | | | | | |
| care | | | | | | | | |
| excitement | | | | | | 0.2 | 0.2 | 0.2 |

```
"intensities": {
  "anger": 2,
  "concern": 2,
  "disgust": 2,
  "fear": 2,
  "sad": 2,
  "joy": 4,
  "surprise": 2,
  "interest": 2,
  "shame": 2,
  "care": 2,
  "excite": 2
 }
}
```

AUTONOMOUS ANIMATION IN EMBODIED AGENTS

RELATED APPLICATIONS

This application claims the benefit of PCT Application PCT/IB2021/060793 (filed on November 22, 21) and New Zealand Application No. 770193 (filed on Nov. 20, 2020). The entirety of each of the foregoing applications is incorporated by reference herein.

TECHNICAL FIELD

Embodiments of the invention relate to autonomous animation of Embodied Agents, such as virtual characters, digital entities, and/or robots. More particularly but not exclusively, embodiments of the invention relate to the automatic and real-time analysis of conversational content to dynamically animate Embodied Agents.

BACKGROUND

Behaviour Mark-up Language, or BML, is an XML-based description language for controlling verbal and nonverbal behaviour for "Embodied Conversational Agents". Rule-based gesture generators, such as BEAT (SIGGRAPH '01) apply rules to generate gestures, paired with features of text, such as key words. This results in repetitive and robotic gesturing, which is difficult to customize on a granular level. Large databases of rules and gestures are required. Speech-driven gesture generators use neural networks to generate automatic movements from learnt gesture and speech combinations. However, these generators often work in a black-box manner, assume a general relationship between input speech and output motion, and have been of limited success.

U.S. Pat. No. 9,205,557B2 discloses a method for generating contextual behaviours of a mobile robot. A module for automatically inserting command tags in front of key words is provided. U.S. Pat. No. 9,721,373B2 discloses programs for creating a set of behaviours for lip sync movements and nonverbal communication which may include analysing a character's speaking behaviour with acoustic, syntactic, semantic, pragmatic, and rhetorical analyses of the utterance.

Efficient, automatic on-the-fly augmentation and/or modification of communicative utterances by embodied, autonomous agents remains an unsolved problem. Further, animating Embodied Agents in a manner that is realistic, non-repetitive and readily customizable remains an unsolved problem.

OBJECT OF INVENTION

It is an object of the invention to improve autonomous animation in embodied agents, or to at least provide the public or industry with a useful choice.

BRIEF DESCRIPTION OF DRAWINGS

FIG. 4 shows an example of the scoring process for Emphasis Detection.

FIG. 9 shows an affective response system.

FIG. 10 shows an example JSON implementation of a Mapping Matrix

DISCLOSURE OF INVENTION

Embodied Agents, such as virtual characters, digital entities, and/or robots may interact with a user by uttering speech from textual input in real-time. An Embodied Agent may be a digital avatar, cartoon character, anthropomorphic avatar, etc., or may be a physical avatar e.g., physical robot, etc. A physical robot may include various mechanical units for different parts, e.g., face part, body part, etc, enabling the physical avatar to make various facial motions and/or body motions.

An Embodied Agent may have a face comprising at least one of eyes, nose, mouth, and may be animated to present various facial motions. The avatar may also have one or more body parts, including at least one of a head, shoulders, hands, arms, legs, feet, etc., and may be animated to present various body motions.

Text to speech (TTS) and lip animations synchronized to the speech enable such Embodied Agents to resemble human-like speech. Nonverbal communication, such as facial expressions and hand-gestures assist with human communication and bring realism and to the animation of Embodied Agents.

Embodiments described herein relate to the autonomous animation of Gestures by the automatic application of animations to Input Text—or the automatic application of animation Mark-up wherein the Mark-up triggers nonverbal communication expressions or Gestures.

Text-to-Gesture

In order for an Embodied Agent's movements to come across as natural and human-like as possible, a Text-To-Gesture Algorithm (TTG Algorithm) analyses Input Text of a Communicative Utterance before it is uttered by a Embodied Agent, and marks it up with appropriate and meaningful Gestures given the meaning, context, and emotional content of Input Text and the gesturing style or personality of the Embodied Agent.

For example: The Input Text: "Would you like to talk about our technology, or our business model?" may be processed by the TTG Algorithm to output→"#SlightlyHappy Would you #Shrug like to #Smile talk about our #BeatBothArmsLeft technology, or our #BeatBothArmsRight business #PalmsSpread model?"

The TTG Algorithm uses Natural Language Processing (NLP) to get the best possible understanding of the context, meaning and communicative intention from-the about-to-be-uttered text, in order to generate the most nuanced and natural gestures for it. The TTG Algorithm is modular and extensible, so that new and more sophisticated analysis can be added, and existing analysis can be modified or removed easily.

Method

Figure 1:
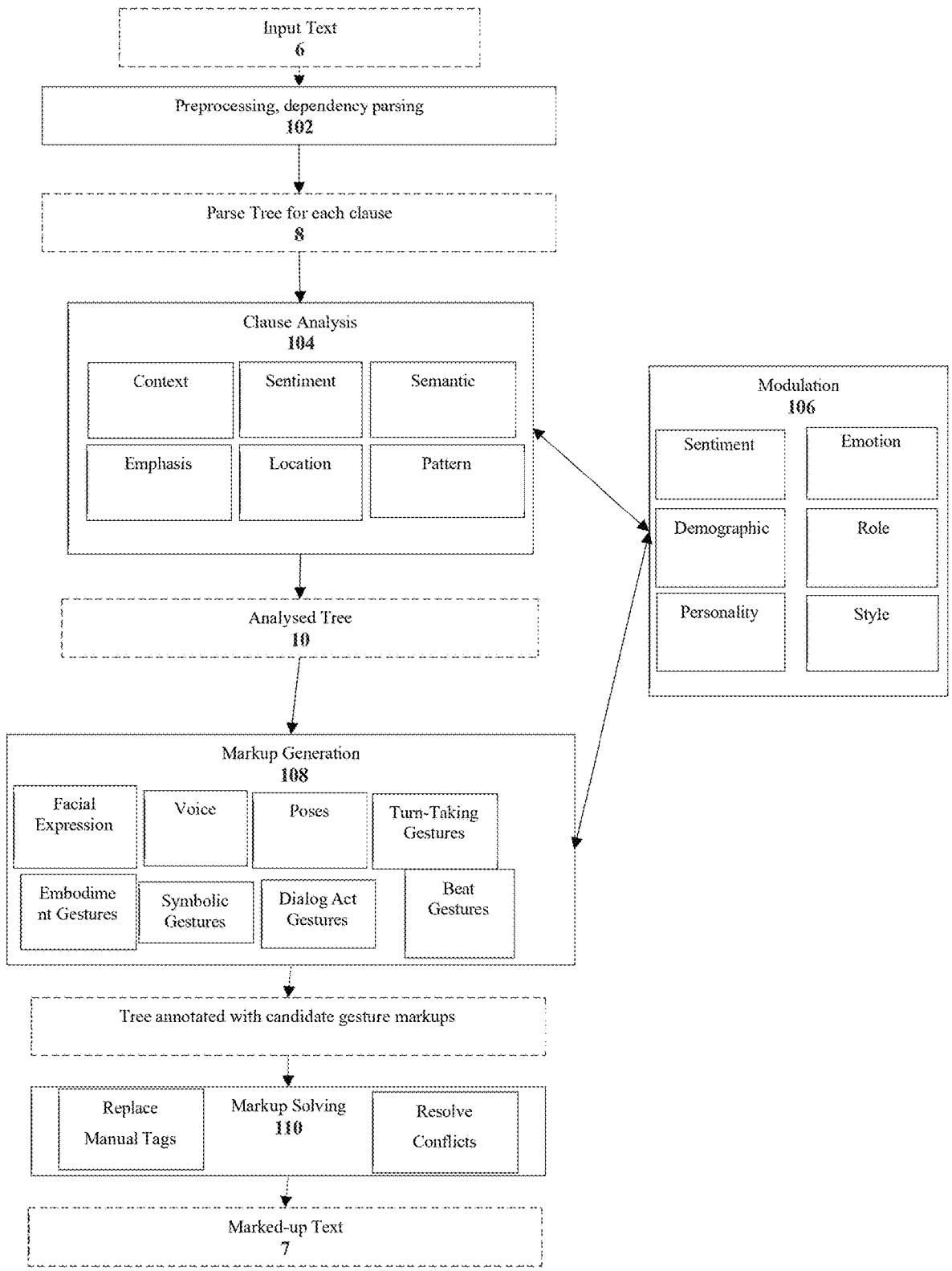
FIG. 1 shows a TTG Algorithm according to one embodiment.

FIG. 1 shows a TTG Algorithm according to one embodiment.

Parsing

At step 102, Input Text 6 is received by a Parser which returns a Parse Tree for each clause of the Input Text 6. Each clause is a tree, and each node in the tree is a token, roughly equivalent to a word, and also contains information about the token such as its lemma, part of speech tag, and the dependency relationship with its parent node, whether it is a strong keyword, part of a list of noun phrases, etc. In one embodiment, dependency parsing outputs a dependency tree, which provides relationships between tokens. Any suitable dependency parsing method or system may be used.

Clause Analyser

At step 104, a clause analyser attaches further information about the Input Text 6 to the Parse Tree 8. The clause analyser derives information about the clause and tokens, to provide as input to the Mark-up Generator which generates Mark-up based on clause analysis information.

Clauses are analysed for semantic and syntactic patterns, keywords, emotions and dialogue acts are identified. In one embodiment, the clause analyser receives a dependency tree and using the dependency information identifies beats, negations and enumeration behaviours in the clause. Clause Analysis also attaches sentiment information to the dependency tree.

Sentiment

Any suitable machine learning or rule-based method may be used to classify the sentiment of the clause. Clauses may be classified based on valence (positive-neutral-negative), arousal (low-neutral-high), and fine-grained emotional content (for example: joy, sadness, anger, surprise, fear, disgust).

In one embodiment, a text sentiment analysis function is constructed using a support vector machine (SVM). Any suitable method of text sentiment analysis may be used. The SVM may be trained using conversational content from a specific domain. For general purpose conversation, the SVM may be trained using a broad range of domains and styles, lengths of utterance and other parameters. Any other suitable classifier may be used, including, but not limited to, a neural network, decision tree, a regression-based classifier, a Bayesian classifier. A deep neural network may be suitable for classifying fine-grained emotional content.

Word Sentiment may identify sentiment at the word level and identify words as positive or negative. In one embodiment, a negative/positive word dictionary is used. The valence of individual words in a clause may be recorded. For example, in a clause with an overall positive valence, the clause analyser may identify on-negated words with positive valence words, and non-negated words with a negative valence.

In one embodiment, sentiment-based animations are applied to sentences, based on the sentiment score. Any suitable model for sentiment analysis may be used and appropriately trained to determine a sentiment score.

Negation Scope Detection

Tokens (words) that are negated can be determined based on dependency links (e.g., descendants of a negation are considered to be negated by the negation). The dependency tree structure may determine the scope of any negation words (i.e. which words can be considered negated). In particular, any word that is a descendant, a sibling, or a nibling (a child of a sibling) of a negation falls within the scope of the negation.

Enumeration

Noun chunks and phrasal verbs may be used to determine groups of words. A list of noun chunks (noun phrases) may be provided.

Phrasal verbs may be detected. In one embodiment, phrasal verbs may be detected by an algorithm comprising the steps of: 1. Finding verbs, 2. Searching backwards for adverbs, 3. Searching forwards for adverbs and preposition and noun phrases.

Information about groups of words may be used to drive animation. For example, in "Would you like a green avocado, or a brown avocado?" an embodied agent could point to the left over "green avocado" and right over "brown avocado", rather than treating them as individual words.

Beats may be repeated within a group. For example: "I am going on holiday tomorrow" might trigger a circle on 'going' and a chop on 'tomorrow', but "I can see a big yellow fluffy giraffe" might trigger repeated chops on 'big' 'fluffy' and 'giraffe'.

Dialogue Act Classification

Dialogue act classification may classify dialogue acts such as listing options, asking a question, explaining, offering alternatives, describing, asserting, retracting, offering an opinion, apologizing, greeting, changing the subject, predicting, instructing, explaining, insulting, or teasing. In other words, dialogue act classification classifies what a Communicative Utterance is trying to achieve.

Dialogue act classification may be carried out using any suitable classification method, including, but not limited to, rule-based methods and machine learning based methods. In one embodiment, a deep learning classifier is trained on a broad range of dialogue acts.

For questions, the grammatical mood of the Communicative Utterance may be determined (questions tend to be in the interrogative mood), or check it against a dictionary of 'question' phrases, like beginning with who, what, when, where, how, do, does. The dialogue act classifier may also receive as input whether there is a question mark at the end of the clause. The dialogue act classifier may subdivide this dialogue act into different kinds of questions, like asking the user about themselves or for their opinion, asking for clarification, asking to repeat, and rhetorical questions. Advising and instructing are often in the imperative mood, or preceded by "you should" or "you could".

For offering alternatives or contrasting ideas, it might be two clauses separated by a conjunction such as 'or' or 'but', or two noun phrases or phrasal verbs separated by a conjunction. For example, "We could organise a party for him, or we could wait and see if he organises one himself". For listing several options or items, find a series of noun phrases or phrasal verbs separated by commas or conjunctions. For example, "Are you going on holiday or travelling for work?"; "You will need a pair of 3 mm needles, 100 g of 4ply yarn in the colourway of your choice, and a cable needle."

In another example, if the text is "there are many banks in New Zealand: ASB, ANZ, BNZ and Westpac.", the intention may be classified as "enumeration". Hypotheticals, conditionals, or counterfactuals may be indicated with the phrases "what if", "only if", "if . . . then . . . " and so on.

In one embodiment, dialogue act classification can be combined with sentiment analysis to add further nuances to nonverbal communication.

Tone Classification

The tone of the content being delivered may be classified and used to modulate behavioural performance. Examples of dimensions of tone to classify may include serious vs. humorous, deferent vs. assertive, aloof vs. compassionate, casual vs. formal, or matter of fact vs. enthusiastic. In other words, tone classification classifies the manner of a Communicative Utterance and may modulate gestural and emotional performance while the utterance is delivered accordingly.

Tone classification may be carried out using any suitable classification, including, but not limited to, rule-based methods and machine-learning based methods. In one embodiment, different dimensions of tone may be classified via different machine learning classifiers. In another, a deep learning classifier may classify across a wide range of tonal dimensions.

Pattern Analysis

A pattern analyser finds noun phrases and series of noun phrases, phrasal verbs and series of phrasal verbs. The pattern analyser may identify transitive verbs by checking for a preposition and then a noun phrase, following the rest of the verb phrase. For example, "very quickly running away from the wolf" is analysed as a phrasal verb, because the part of speech tags are, respectively, "ADVERB, ADVERB, VERB, ADVERB, PREPOSITION, DETERMINER, NOUN" (and 'DETERMINER, NOUN' is a noun phrase).

The pattern analyser may determine the mood, tense, verb form, adjectival form (eg superlative, comparative), person, number and other morphological features.

Such information may be used to influence animation—for example, by increasing the size of gestures on superlative and comparative tokens.

The "person" of a clause may influence animation by animating actions such that they are directed to the appropriate "person". For example, a clause in first person may generate more speaker-directed actions, a clause in second person may generate more listener-directed actions and a clause in third person may generate undirected actions.

Tense of a clause may influence gestures, for example, by animating clauses in the past tense with more "rigid" animations, and the future tense with "looser" animations, representing hypotheticals.

Location Analysis

Dictionaries of positional and directional phrases may be provided: one for each of high, low, narrow (or centre) and wide. These can be exact string matches or pattern matches, for example "under $NOUNPHRASE" would match to "he was under the sea", "it was under a big round table" and "she was there under some kind of pretence" but not "they were under 18".

Context

Contextual information from previous clauses and even previous conversation turns (both the Embodied Agent 12 and the user's) to provide broader context for the particular clause being analysed. For example, if the Embodied Agent 12 is asking the user to repeat themselves, the Embodied Agent 12 may perform the utterance slightly differently the second time around: with more emphasis on the key points or with less hesitancy. If a proper noun or other term has already been introduced into the conversational context, it may be less likely to be a keyword in subsequent mentions. If the current utterance is changing the topic of conversation, there may be more (or larger or more forceful) gestures to indicate emphasis on the new topic.

Mark-up Generator

At step 108, a Mark-up Generator uses the information in the Analysed Tree to generate Mark-up for various kinds of gestures. The Analysed Tree may comprise a Parse Tree annotated with information from Clause Analysis. Each of these Mark-up generators may add candidate Mark-ups before or after the whole clause, or before or after any individual word. Many gestures 'hit on' (or 'are triggered on') a word, by which we mean that the stroke point of the gesture (extreme point) occurs at the same time as the stressed syllable of that word. This means that the gesture may start before the word, in order to give it time to reach its stroke point at the moment of the stressed syllable.

Gestures include facial expressions, head and neck gestures, arm and hand gestures, and full body movement. All gestures are made up of a pose and an action, where the pose is the starting point of the gesture and the action is the motion applied from that starting pose. For each action, the starting pose may be defined explicitly or it may be whatever the current pose is, for example the end pose of the previous gesture.

Dialogue Act Specific Gestures

Examples of dialogue act specific gestures which may be applied include: Questions triggering shrugs and palms up outward arcs, triggering on the main verb or keyword of the clause. Negations trigger head shakes and arms crossing over or wrists flicking dismissively. Offering alternatives map to one hand out to one side and then the other to the other, indicating weighing scales. Listing nouns or verbs as, for example, three options, map to both arms gesturing with a chop to one side, then both in the middle, then both to the other side (or similar gestures that follow a path, such as pointing at a low level, then a bit higher, then a bit higher still). Any more than four items in a list instead maps to counting off on the fingers.

Symbolic Gestures

Symbolic gestures are those that carry a specific meaning. The meaning might be emblematic (the gesture stands in for a word or phrase), for example a wave communicating a greeting; iconic (the gesture literally represents the meaning of the word or phrase), for example tracing a square shape for the word "box"; or metaphoric (the gesture represents the meaning of the word or phrase, but not literally), for example tracing a square shape for the word "confined". These are triggered from a dictionary lookup for each gesture, containing emblematic, iconic and metaphoric trigger phrases in one dictionary. The phrases in the dictionary can optionally indicate which word in the phrase the gesture should hit on. By default, it will hit on the first word in the phrase. These phrases can also be matched to patterns rather than exact string matches, for example "I am Sam" matches the pattern "I am $PROPERNOUN", but "I am hungry" does not. This kind of gesture should be applied sparingly, otherwise it can look like they are acting out the utterance, which can come across as comical or patronising. The rate of symbolic gestures is defined in the personality/style configuration. In one embodiment, symbolic gestures match against a universal dictionary for each gesture.

Beats

Beat gestures emphasise words non-meaningfully (e.g. not in a symbolic way or connected to any specific dialogue act). Beats are triggered on words in the clause as picked out by the Emphasis Detection algorithm, at a rate defined in Configuration Settings. The Action is chosen based on the personality and gesturing style as defined in the config. The kinds of Actions include chops (up, down, diagonal), circles, and arcing actions, all of which can be applied on a range of base arm and hand Poses to produce a wide variety of gestures: from a rigid pontificating gesture to a fluid open arcing gesture.

Thus Beats are applied to keywords as specified in the analysed tree, of types defined in global Configuration Settings. Each beat gesture consists of a pose and an action, and each pose consists of arm, wrist, and hand elements.

Embodiment Gestures

Embodiment Gestures are gestures that people do in virtue of being embodied. For example, people take a deep breath or sigh before starting a long description or explanation. In Embodied Agents, deep breaths may be triggered before long sentences. Another example is shifting weight from one foot to the other, which occurs when people get tired. In Embodied Agents, this may be triggered between (some) clauses and in other gaps. Pausing and looking up to one side to think or remember something, may be triggered stochastically between clauses and before long or very rare words, or proper nouns the first time they are used, as if trying to think of the word or name. Sometimes these are accompanied by a furrowed brow, or a filled pause or hesitation marker such as 'um'. People do a wide array of grooming gestures, such as straightening their clothes, scratching their noses, or tucking their hair behind their ears, which are triggered in gaps with no other gestures, at a rate that is specified by the personality of the individual.

Turn-Taking Gestures

When people pause their speech but don't intend to cede the conversational floor, they tend to look away and sometimes do floor-retaining gestures (such as holding up a hand or a finger), or fill the pause with an 'um' or 'A'. Turn-taking behaviour may be triggered at some clause boundaries and before long or rare words, including proper nouns the first time they are mentioned. When people have finished speaking, to cede the floor, they (for example) make direct eye contact and smile expectantly, sometimes also doing a 'your turn' type gesture (for example, one or both hands with palms up indicating towards the conversational partner). Such gestures are triggered at the end of their entire utterance (which may be one or several clauses). When a conversational partner (user) attempts to interrupt the character, they might do a floor-retaining gesture to indicate they're not giving up the floor, or they might look a bit surprised and stop talking and gesturing, ceding the floor to the user (how likely they are to do this may be configurable based on personality and role). When a user is speaking, backchannel gestures are triggered in the form of nods and smiles, frowns, 'hmm's and 'uh huh's, based on rapid sentiment analysis of interim STT results.

Poses

A pose is the starting point for a gesture: where the body moves to before it starts the gesture. For example, poses may include body, head, arm, wrist and finger elements. Each of these may have a base pose and some controlled random variation added on. Each element is chosen from a set of base poses that are compatible with the chosen action (as the action is the main part of the gesture, it is chosen first). From these compatible poses, the pose is chosen stochastically at frequencies defined by the personality, style and role config. Controlled random variation is obtained by blending in a small amount of a "variation pose". These variation poses are chosen using information from the location analyser, as well as the sentiment scores, and if not determined by those, is chosen at random. The amount of the variation pose that is blended is chosen from a range specified either by the location analyser, sentiment modulation, or the default range (which is likely to be smaller values since it's just for adding variety, not visibly pulling the pose in a specific direction).

Voice Modulation

Tags may be inserted to modulate the voice in order to align it better with the gestures chosen; the result being a coherent overall performance of the utterance. For example, speed, pitch, and volume of the voice on individual words may be modified to emphasise those words. Such features may be modulated for an entire clause to change the emotional tone. For example, increasing speed and volume while decreasing pitch sounds more angry, decreasing all three makes it sound more sad, etc.

Mark-Up Solver

The Mark-up solver takes the Parse Tree which has been annotated with all the candidate Mark-ups as decided by the respective Mark-up generators, and outputs the original text with appropriate Mark-ups added to produce a coherent performance of that utterance to be sent to be processed into speech and animation.

For example, some gestures can be performed together (like one head gesture and one body gesture), while others cannot. Some gestures only make sense to perform in conjunction with a series of other gestures (for example, if the utterance was "on one hand, A, but on the other hand, B" it makes the most sense to do both sides of the gestures for weighing up two options, rather than doing one side and not the other). This Mark-up solver resolves these conflicts but retains connected gestures, to build a coherent gestural performance of the utterance.

In one embodiment, for words that have at least one Mark-up tag, the Mark-up Solver picks at most one body gesture and one head gesture for each word. This may be implemented using a priority-based approach. Where there are multiple candidate gestures for a given word, gestures may be chosen in a predefined order of priority. In one embodiment, the following order of priority is used:

Replacing existing manual tags
Client-override tags
Symbolics, but not too many
Dialogue acts
Enumerating
Beats
Turn-taking
Embodiment In another embodiment, the whole clause or even the whole paragraph is taken into account, to ensure that the gestures taken as a whole formed a coherent performance. It would ensure that a series of gestures taken together formed a sequence in a sensible or natural pattern. For example, a wide arcing gesture followed by one or more small chop beats is a common sequence, but a chop then an arc then another chop is less natural, and a series of gestures that zigzag in space (wide, narrow, wide, narrow) tends to look unnatural unless they are zigzagging for a communicative (symbolic) reason. It would also ensure that longer or more significant gestures were given enough time to play out but shorter gestures could be triggered in faster succession.

Pose and Action Scheme

A Pose and Action scheme independently applies Pose and Action to Input Text. Independent Poses and Actions may be applied to beat gestures, or any other suitable type of Gesture.

Pose

A Pose is the dimensions and/or position of a Gesture, such as the position of limbs. For example, the Pose of the arms of a Embodied Agent (e.g. arm positions) may be wide/narrow, or high/low.

Wide/Medium/Narrow
High/Medium/Low

Figure 5:
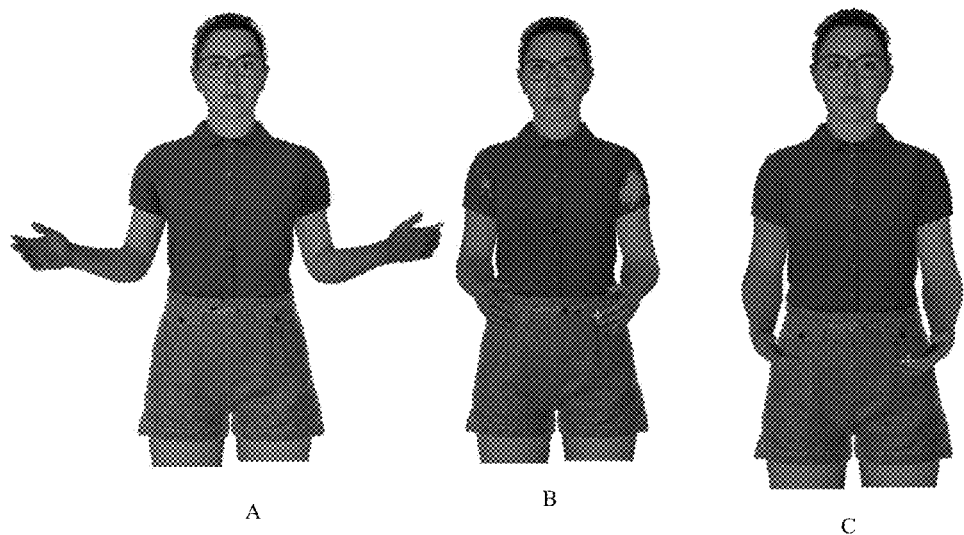
FIG. 5 shows an Embodied Agent in a variety of different Poses.

FIG. 5 shows an Embodied Agent 12 in a variety of different Poses while the Embodied Agent 12 speaks a Communicative Utterance. The Input Text and Mark-up of the Communicative Utterance is as follows:

[middle_pose][strong_beats] Please place your [low_beats] ticket [low_pose] under the [medium_beats] scanner.

The example shows how Poses and Actions may be applied at different parts of Input Text. Once a pose is defined, all subsequent actions start from the defined pose.

FIG. 5A shows the Embodied Agent 12 in a wide arm/medium arm height Pose. FIG. 5B and FIG. 5C show the Embodied Agent 12 in a low arm height Pose.

Poses may be associated with a pose speed (how quickly a certain pose is reached from a neutral pose or previous pose). Poses may be associated with property tags, e.g.:

String name
Left/Right or both (referring to whether the pose is a handed one)
Dimension tags. For example, Arm poses may be associated with a width tag (e.g. whether it is a narrow, medium, or wide width pose) and/or a height tag (whether it is a high, medium, low height arm pose).

In one embodiment, the Embodied Agent 12 is returned to a "neutral" pose after each action. In another embodiment, the end pose of a certain action may become the new start pose of a new Action.

Actions

Actions refer to the movement trajectories of various feature points in a face part or a body part. Actions may be based on any suitable 3D reconstruction techniques. For example, an Action indicating a body motion may be reconstructed by a set of predetermined feature points in the body part.

Actions may be configured with suitable parameters, including, but not limited to:

Type
Intensity
Frequency
Speed one property of each action is which poses it can be applied on top of (not all combinations work, for example if the pose is already wide and the gesture is opening the arms out wide).

Word-Token-Matching Regular Expression

A regular expression is a sequence of characters that specify a search pattern. These patterns can be used by text-searching algorithms to find instances of text that match the pattern. Modern regular expressions used in computing are called 'regex' and typically include (but not limited to) these operators:

Normal text characters and numbers: a-z, A-Z, 0-9, CJK characters, spaces etc. e.g. a search pattern "a" will match the text "cat" at the second position. E.g. A search pattern "cat" will match the text "concatenate" at position 4.
'.': A dot is a wildcard. It will match any character. E.g. A search pattern "c.t" will match "cat", "cot", and "cut".
'*': An asterisk will match zero- or more of the preceding character. E.g. A search pattern "cut*" will match zero or more of the 't' character: "cube", "cute", "cutting"
'+': A plus sign will match one-or-more of the preceding character.

'( )': Parentheses define scope and precedence of operators.

In one embodiment, a method of text-matching operates on clause tokens instead of individual characters.

A "token" normally corresponds to an individual word with some exceptions: "don't" resolves to two tokens representing "do" and "n't". Grammatical particles, such as a comma ",", have dedicated tokens. These tokens encapsulate linguistic features of the text they represent as attributes, including (but not limited to):

Part-of-speech: Noun, Verb, Adjective, Punctuation etc. These can be specified as a standard shorthand: "adjective" is "ADJ", "proper noun" is "PROPN" etc.
Detailed part-of-speech: comparative adverb, determiner, proper singular noun, etc.
Lemma: The base form of the word. E.g. the lemma of "looking" is look. The lemma of "is" is "be".
Stem: The word stem (Not currently used in any form. Could be used in the future). E.g. The stem of "fishing", "fished", and "fisher" is "fish". The stem of "argue", "argued", "argues", and "arguing" is "argu".
Dependency: The syntactic dependency, or the relationship of a token to its parent token (Tokens exist within a tree structure and each token may have a parent or children).

Ordinary text can be converted into tokens using any suitable tool, such as SpaCy.

This token-based text matching can be used by specifying an attribute to match with. For example:

"$lemma:look over there" will match "They looked over there", "They are looking over there", and "They will look over there".
"I am $pos:PROPN" will match proper nouns, e.g. the character introducing themselves: "I am Sam", "I am Rachel" etc.
"was $pos:ADV+excited" the '+' symbol will match one-or-more of the preceding operator (adverb). e.g. "I was really excited", "I was really very excited"—"really" and "very" are both adverbs in this sentence.
The asterisk operator can be used similarly to match zero-or-more: "was $pos:ADV* excited" will additionally match "I was excited".
"a. or." the '.' symbol here will match any token, unlike in normal regular expressions where it would match a single letter/numeral. "a. or." could be useful for detecting when alternatives are being presented.

Dictionary files storing lists of these search patterns may be stored. If some text matches one of the search patterns, a relevant action or emotion may be registered to be performed when that text is spoken.

Configurability

Gestures, Poses and Actions may be configurable. In one embodiment, possible configurations of Gestures, Poses and Actions are defined in Gesture Configuration Settings. For example, a Gesture Configuration File such as a JSON may define all Gestures, Poses and Actions, along with the available parameters of those Gestures, Poses and Actions. Examples of configurable parameters include:

pose intensity (what is the weighting on a particular pose)
gesture intensity (how pronounced or accentuated is the gesture)
gesture frequency (what is the probability of the gesture being used)

In one embodiment, Gesture configurations are defined in Gesture Configuration Settings. Gesture Configuration Settings may determine available Gestures and ranges of motions for each type of gesture. Gestures may be "complete" gestures, meaning they include both a complete action and pose, as opposed to being split by pose and action.

For each Gesture, Configuration Setting may include a range of movements and configurable parameters for that Gesture. For example, acceptable values for the speed of an Action may be restricted between a "speed min" and a "speed max" value. A gesture speed value may be randomly generated between speed min and speed max, and provided as input to "[speed,0.98]"

Gesture frequency defines the probability of a gesture being randomly selected. Each gesture, or category of gestures, may be associated with a frequency. For example, various beat gestures may have the following frequencies: "chop": 0.4, "circle": 0.1, "small arc": 0.5, "wide arc": 0. When a word has been identified as one that needs a gesture, an appropriate gesture may be selected based on the frequency rates.

BEAT Action Configuration Settings, for example, for a movement of an arc with palms down, may define a set of available arm poses, wrist poses and hand poses are defined (as some actions are not compatible with some poses). The Configuration Setting also defines amplitude ranges for four preset beat "strengths", i.e. extra strong, strong, medium, or low. The Emphasis Detection algorithm described herein determines the "strength" of a beat for each word (if any), and the exact strength is randomly chosen within the given range. In runtime, when generating a beat gesture, a random selection may be made from each of the available arm, wrist and hand poses. BEAT pose Configuration Settings may be defined for wrist poses, including variation poses for wrist poses, such as for palms up, palms down, and palms centre.

Personality Configuration—Global Configuration Setting

In one embodiment, Embodied Agents are endowed with different personalities using one or more Global Configuration Settings. Global variables may be set which affect the expression of all Gestures. Global Configuration Settings define the tendency and usage of Gestures within possible ranges. An Embodied Agent's personality may be configured using Global Configuration Settings.

In one embodiment, a global Configuration Setting json encapsulates all levers a character author might want to tweak to create a gesturing style: such as Gesture speed, Gesture height and width (average), types of beat action, Hand poses, Wrist orientation, Excitability, hesitancy and any other suitable parameters.

In a further embodiment, the parameters in the global Configuration Setting may be modulated.

In one embodiment, the global Configuration Setting defines the following global parameters:
Speed The global Configuration Setting may define parameters that determine the speed of Actions. For example, The global Configuration Setting may determine a minimum speed and a maximum speed for Actions. In one embodiment, different speed parameters may be set for different types of Gestures. For example, symbolic Gestures and beat Gestures may be configured with different speed parameters.

Symbolic Gesture speed defines how fast the Embodied Agent moves into Symbolic Gestures. A minimum speed and a maximum speed for moving into Symbolic Gestures may be defined for the Embodied Agent.

Beat Gesture speed defines how fast the Embodied Agent moves into Beat Gestures. A minimum speed and a maximum speed for moving into Beat Gestures may be defined for the Embodied Agent.

Gesture Type
rates of different types of beat gestures may be defined. For example:

```
"beat_types": {
    "values": [
        {
            "name": "arc_palm_down",
            "rate": 0.2
        },
        ...
```

Gesture Frequency

The global Configuration Setting may define the frequency of certain types of Gestures by an Embodied Agent. For example, a maximum number of Symbolic gestures per sentence may be defined, ensuring that the Embodied Agent does not display too many symbolic gestures.

The global Configuration Setting may independently set the rate of strong gestures, medium gestures, and low gestures (which may be used to create variety in Beat Gestures). A weight of 'strong', 'medium' or 'low' is placed on each emphasised word. A global configuration not rate_strong, rate_medium, rate_low defines how often gestures of different sizes are used for a personality. The sum of these three values is the overall gesture rate. The global Configuration Setting sets how many strong, medium, and low beats an Embodied Agent utters in a sentence.

An "emphasis" parameter changes the speed of speech based on the emphasis strength. A negative value will slow down speech. E.g.

```
"emphasis": {
    "tag": "[[ speed EMPHASIS]]",
    "strong": -0.25,
    "medium": -0.2,
    "low": -0.15
},
```

A "head": configuration adds high-level (#) markup tags on emphasised words based on strength of emphasis and sentiment of the sentence. These high-level tags are defined in a high-level configuration file.

Sentiment threshold variables may define the range of neutral sentiment. Sentiment analysis may return a value between −1.0 (full negative) and +1.0 (full positive). Within a type of gesture, the global Configuration Setting may set the frequency of certain subtypes of gestures (e.g. circling actions, chopping actions etc), or even the frequency of individual gestures.

Pose Configuration/Gesture Dimensions

The global Configuration Setting may determine the tendencies of gesture dimensions for an Embodied Agent. For example, for Beat Gestures, the global Configuration Setting may define the frequency of different poses, e.g. arm positions. In one embodiment, the global Configuration Setting defines what percentage of an Embodied Agent's arm positions are in a low, medium or high arm height/position, and independently defines what percentage of an Embodied Agent's arm positions are in a low, medium or high width from one another. There may be independent configurations for:
  arm_positions: the rates of different arm heights and widths for beat gestures. height(low, mid, high), width (narrow, middle, wide, extra-wide)
  hand_positions: the rates of different hand positions/shapes used for beat gestures hand_orientation: Embodied Agent's tendency to gesture with palms up, centre, or down Handedness and Symmetry Embodied Agents may be configured to have a "handedness", by defining the frequency and/or strength of gestures on one hand to be greater than that on the other, in the Configuration Setting.

The rate of each hand for single-handed symbolic gestures may be defined, e.g.

```
"handedness": {
    "values": [
        {
            "name": "left",
            "rate": 0.5
        },
        ...
```

The rate of non-symbolic (beat) gesturing hands together, vs one or the other may be defined, e.g.

```
"symmetry": {
    "values": [
        {
            "name": "together",
            "rate": 0.4
        },
        ...
```

Emotion

An emotion parameter may define how much the animation of an Embodied Agent is affected by emotion. An emotional_threshold parameter defines how easily emotion affects an Embodied Agent, by defining how high a sentiment score must be before a size of gesturing is increased. A pose_speed_multiplier parameter multiplies the pose speed when the emotional threshold is exceeded. An action_speed_multiplier multiples the action speed when the emotional threshold is exceeded. In other pose and action speed may be modified additively rather than multiplicatively.

A rate_multiplier may define how much the Embodied Agent's frequency of gestures increases in response to emotion.

A size_level_offset may increase the size of gestures by a number of levels in response to emotion.

A height_offset may define an increase in the height of gestures, and a hands spread offset may define an increase in the width of gestures.

Gesture Intervals

A gesture_interval variable may define a minimum and maximum number of words between gestures.

A first_gesture_offset variable may predefine the minimum number of words before the first gesture of a sentence. This ensures that the first gesture doesn't start to play before the Embodied Agent is speaking. That is, that the gesture offset is smaller than the total time the Embodied Agent has been speaking.

A hesitancy variable may inject hesitancy markers, or filler words (such as "ums" and "ahs").

The global Configuration Setting may define parameters determining how affected Embodied Agents are by various inputs.

For example, emotional modulation may be achieved by setting a variable which determines how affected an Embodied Agent is from the sentiment of a sentence.

However, sentence sentiment is only one example of input which may affect the behaviour of the embodied agent.

Other aspects may include audio input (e.g. from the agent's virtual environment or from a user via a microphone), visual input (e.g. from the agent's virtual environment or from a user via a camera), input from a user interface, or any other suitable input.

The parameters within the global Configuration Setting may be associated with multipliers, which are set using modulatory rules. For example, action speed multipliers may be set to modulate the speed of gesturing, and rate multipliers may modulate the frequency of gestures. A size level offset may increase the amplitude of gestures (resulting in gestures getting "bigger" or "smaller)".

Randomization

By defining ranges of gesture parameters, and frequencies of gestures, the global Configuration Setting parameters affect the degree of variation and randomization of autonomous animation.

Modulation

At step 106, Modulation may include:
- swapping out animation files (so that one individual uses eg "wave01" and another uses "wave02" in the same place in speech);
- using different gestures (so one individual uses "chop" and another "circle" for emphasis);
- increasing or decreasing speed or amplitude of gestures (S);
- modifying the rate of gesturing (how many gestures Embodied Agents carry out).

Modulation may modify the overall rates of gesturing, and/or rates of certain types of gesturing. Rates of gesturing can be set in a Configuration Settings, and determines how many gestures (of various kinds) are applied to sentences.

A modulation Module may modify and/or be modified by clause analysis and/or markup generation.

Demographic Modulation creates differences in the gesturing style of Embodied Agents across factors like age, gender, race, and culture. For example, Embodied Agents portraying younger characters may be more expressive and less dominant than older characters. Some gestures are meaningful only within a specific culture or may have quite different meanings in different cultures (even when they speak the same language).

Personality Modulation may modulate gestures to align with personality traits such as extroversion, introversion, confidence, friendliness, openness. These are defined in a config and map onto more fine-grained behavioural traits (eg high energy). The fine-grained traits map onto low-level differences in gesture mark-ups (eg more frequent, bigger, faster gestures). These differences are implemented by using different average values for gesturing rate, amplitude, and speed respectively. Further examples of personality modulation include: higher rates of embodiment gestures for nervous or less confident personalities (these are inserted between clauses with some probability—change the probability to change how many they do on average); wider variety of gestures for more expressive personalities (set the rates of each gesture to be lower but greater than zero for many gestures, vs higher rates for a smaller number of different gestures); higher prevalence of palms-up, open hand, more fluid/smoother arcing gestures for friendlier and more open personalities; higher prevalence of rigid pontificating gestures for more authoritative personalities (set a higher rate for eg gestures in which the palms are up).

Style Modulation may apply idiosyncratic gesturing styles to Embodied Agents. Style Modulation may be more fine-grained than personality modulation, and define low-level gesture characteristics, such as whether an Embodied Agent tends to gesture with a relaxed palm up hand pose, or a stiff fingers spread palm down hand pose (or many other options), and whether they tend to use chop actions, circling actions, fluid arcing actions etc, and whether they tend to use their left or right hand, or tend to gesture symmetrically. All of these can be defined broadly by their personality, but they can be tweaked to give the individual character a unique style. These are all defined in a high-level/personality Configuration Settings, in which the rate of left/right/both hands can be set, and the rate of chop gestures and circling gestures, etc.

Role Modulation enables a single Embodied Agent to display different gesturing behaviour depending on the role they are in at the time, even for the same utterance. For example, if a person is presenting an idea at a conference talk, they will likely use different gestures to when they are engaging in a casual conversation, even if in both cases they're saying the same words. Other roles may include explaining or outlining some facts, guiding or advising, tutoring or teaching. The particular role that the character is playing interacts with their personality and idiosyncratic style to form the resulting overall gesturing style.

Sentiment Modulation refers to using the results of sentiment analysis to trigger specific gestures, and also to modulate potentially any or all other gestures. The specific gestures might be smiles and eyebrow raises, thumbs up or clapping for pleased or happy emotions, especially for expressing pleasant surprise, or frowns and clenched fists for expressing anger or frustration. The arousal expressed in the clause also modulates the gestures that are chosen. For example, high arousal (such as clauses expressing excitement or frustration) will mean that the poses (the starting points of the gestures) become wider and higher, fingers become more spread, gestures become more frequent, and actions become bigger and faster.

This is achieved in two ways: first, by adding offset values to the frequency of gestures and the amplitude and speed of each gesture. The offset is positive for high arousal, and negative for low arousal, and is scaled so that the higher the arousal, the higher the offset and vice versa.

Second, for the arm and hand poses, a variation pose is blended in. For the arms, the variation pose is the widest and highest pose (for high arousal), which is blended with the base pose to a small-medium degree to 'pull' the base pose for each gesture wider and higher. For the hands, the variation pose is the fingers at maximal spread blended to a small-medium degree, which pull the fingers slightly more spread in whichever base pose they are in. These offsets and degrees of variation poses are configurable as part of the modulation of personality and gesturing style. For example, one character may be more expressive than another, so highly emotional content will have a larger impact on their gesturing behaviour.

Sentence-level emotion configuration takes the overall sentiment of a sentence and applies the relevant change in emotion. Each emotion (such as anger, concern, disgust, fear) may be connected to a dictionary (defining words triggering the emotion). For each emotion, low, mid and high values of the emotion may be defined, each having an intensity and a duration. The intensity of the detected emotion may be determined by sentiment analysis. A duration may define how long the emotion lasts. An intensity multiplier define the extent to which a base emotion is negated.

The Agent may be simulated using a neurobehavioral model (biologically modelled "brain" or nervous system), comprising a plurality of modules having coupled computational and graphical elements. Each module represents a biological process and includes a computational element relating to and simulating the biological process and a graphical element visualizing the biological process. Thus, the Agent may be "self-animated" to perform certain behaviour without external control and thus exhibit naturally occurring automatic behaviour such as breathing, blinking, looking around, yawning, moving its lips. Biologically based autonomous animation may be achieved by modelling multiple aspects of the nervous system, including, but not limited to, the sensory and motor systems, reflexes, perception, emotion and modulatory systems, attention, learning and memory, rewards, decision making, and goals. The use of a neurobehavioral model to animate a virtual object or digital entity is further disclosed in: Sagar, M., Seymour, M. & Henderson, A. (2016) Creating connection with autonomous facial animation. Communications of the ACM, 59(12), 82-91 and WO2015016723A1, also assigned to the assignee of the present invention and is incorporated by reference herein.

The Autonomous Animation System may give and receive signals to and from the neurobehavioural model. Sending signals allows the sentiment and content of the Embodied Agent's utterances to affect their internal emotional state, which in turn may affect their underlying emotional or idle animations. Receiving signals allows external factors to affect their gestures, such as the character's perception of the user's emotional state or identification of objects in the field of view, allowing them to be more responsive to the user and the situation. Another example is detecting that the user is paying attention and if not, introduce some speech disfluency: for example, stopping and restarting clauses.

Variation Poses

Instead of adding random variation to each particular joint (which may result in unnatural poses), a Variation Pose system enables the blending between two or more coherent Input Poses to create a new pose Variation Pose. Input Poses may be deliberately authored by an animator to blend in a coherent manner.

Figure 6:
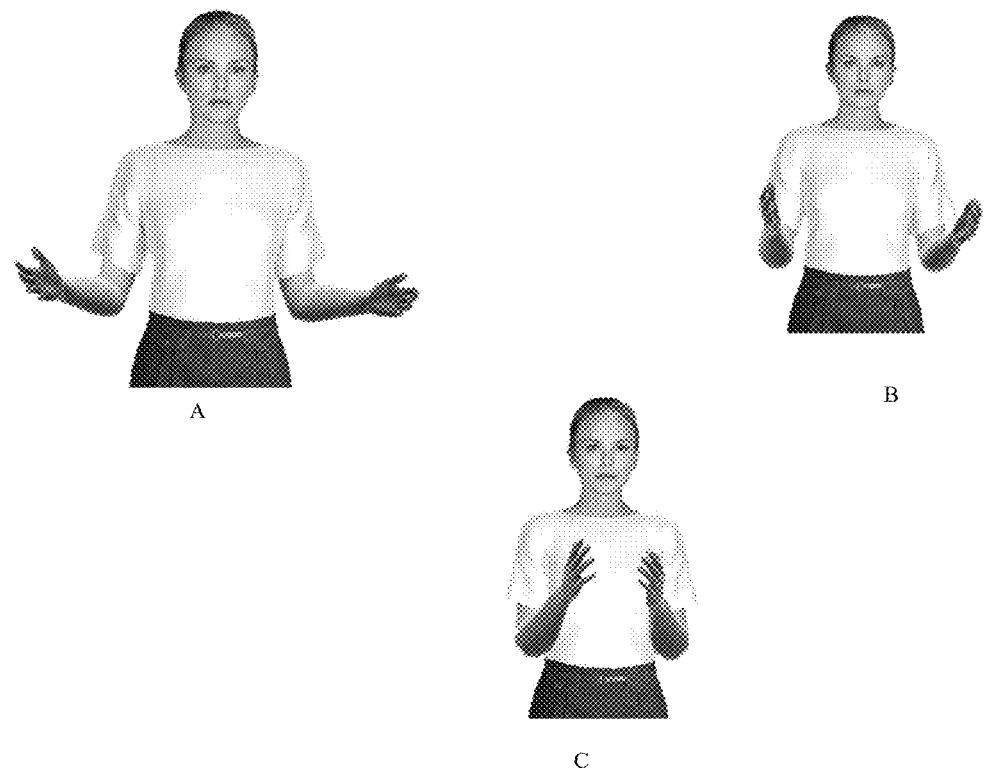
FIG. 6 shows blending between arm Variation Poses.

FIG. 6 shows blending between arm Variation Poses. FIG. 6A shows an Input Pose of a wide stance, FIG. 6B shows a Variation Pose configured to blend with the pose of FIG. 6A. FIG. 6C shows a Blended Pose which is an intermediate pose between FIG. 6A and FIG. 6B.

Figure 7:
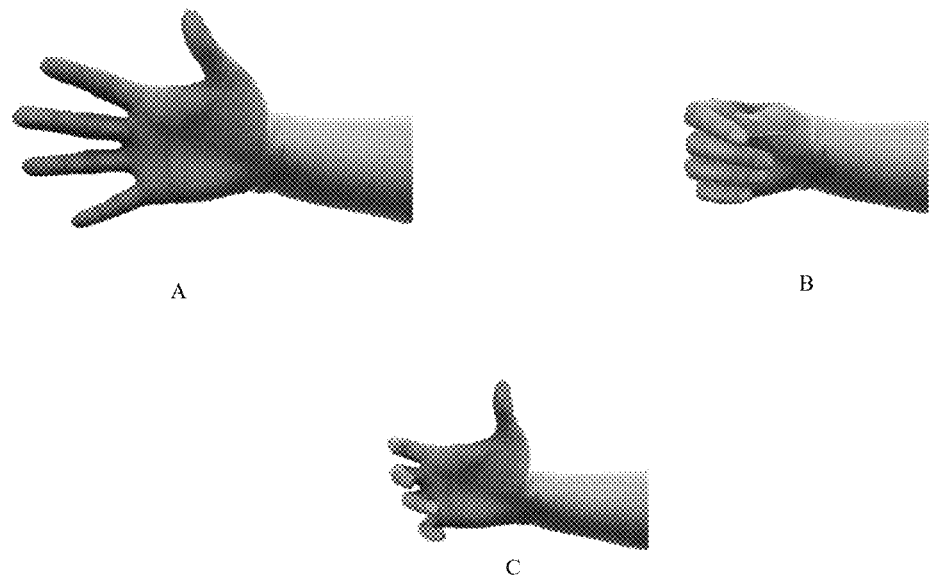
FIG. 7 shows a first example of blending between hand Variation Poses.

FIG. 7 shows a first example of blending between hand Variation Poses. FIG. 7A shows an Input Pose of an outstretched hand, FIG. 7B shows a Variation Pose, of a folded hand, configured to blend with the pose of FIG. 7A. FIG. 7C shows a Blended Pose which is an intermediate pose between FIG. 7A and FIG. 7B.

Figure 8:
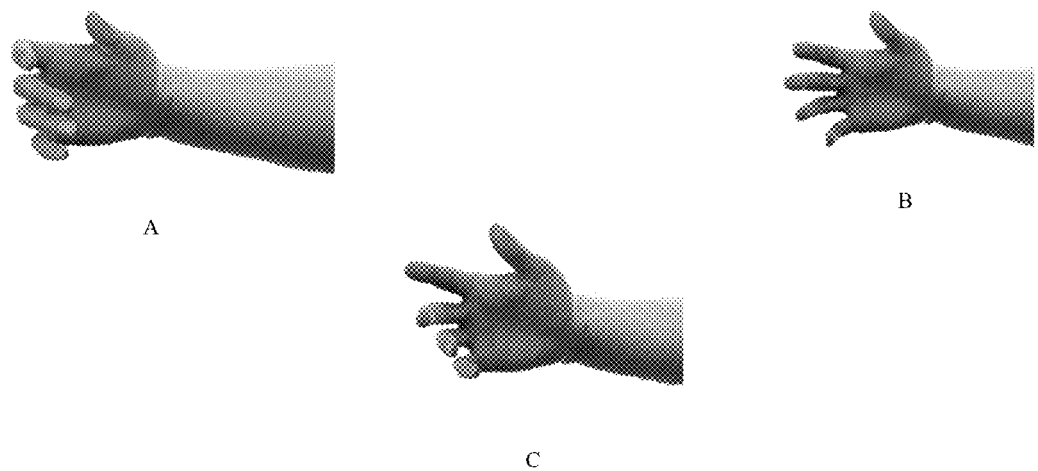
FIG. 8 shows a second example of blending between hand Variation Poses.

FIG. 8 shows a second example of blending between hand Variation Poses. FIG. 8A shows an Input Pose of a hand with curled fingers, FIG. 8B shows a Variation Pose configured to blend with the pose of FIG. 8A. FIG. 8C shows a Blended Pose which is an intermediate pose between FIG. 8A and FIG. 8B.

In one embodiment, the TTG System generates a Variation Pose using the following steps:
  Select or receive an Input Pose. In one embodiment, the Input Pose is a "base pose", which means it is the default pose in which a body part of the Embodied Agent is configured.
  Select or receive a corresponding Variation Pose, configured to blend with the Input Pose.

Blend between each Input Pose and one or more Variation Poses to generate a Blended Pose.

In one embodiment, an Input Pose and the Variation Pose are each selected with an intensity, and blended together (e.g. 0.8 Pose 1 is blended with 0.9 Pose 2).

In another embodiment, two or more Variation Poses, configured to blend with one another are selected, and blending weights between each of the poses is randomly generated, specifying the degree to which the Variation Poses are blended (e.g. 0.2 Pose1 is blended with 0.4 Pose2 and 0.4 Pose3).

Poses selections may be restricted to be compatible with the action that is about to come. There may be predefined a set of compatible poses for each action from which one is chosen.

Autonomously Emotive Speech

In one embodiment, Embodied Agents are autonomous dynamic systems, with self-driven behaviour, which can also be controlled (in a weighted or controllable fashion) externally by the TTG System as described herein, allowing a blend of autonomy (wherein Embodied Agent gestures are driven by their internal emotional states) and directability (wherein Embodied Agent gestures are driven by text as per the TTG System). "Bottom up" autonomous behaviour may be facilitated by a programming environment such as that described in the patent U.S. Ser. No. 10/181,213B2 titled "System for Neurobehavioural Animation". A plurality of Modules are arranged in a required structure and each module has at least one Variable and is associated with at least one Connector. The connectors link variables between modules across the structure, and the modules together provide a neurobehavioral model. Variables and/or Modules may represent neurotransmitter/neuromodulators such as dopamine or oxytocin, which may be used to affect the operation of the structure.

The neurobehavioural model may include an emotional system as described in the patent application PCT/IB2020/056280, ARCHITECTURE, SYSTEM, AND METHOD FOR SIMULATING DYNAMICS BETWEEN EMOTIONAL STATES OR BEHAVIOR FOR A MAMMAL MODEL AND ARTIFICIAL NERVOUS SYSTEM, incorporated by reference herein.

For each word carrying emotional content, the TTG System may output both a possible gesture plus one or more emotional impulses. Each emotional impulse perturbs the state of the internal emotional system. The internal emotional system is a dynamical system in flux, with emotions competing against each other and sustaining and decaying, providing a history of emotional states.

Thus, the internal emotional reaction of the Embodied Agent depends on the content and order or sequence of the word.

In one embodiment, the TTG System may process each word sequentially and output one or more emotional impulses as soon as the word is processed. In another embodiment, the TTG System may process an entire clause, sentence, and/or paragraph, and output emotional impulses according to any suitable rules or analysis of the sentence.

Thus, the Autonomously Emotive Speech drives the emotional system in a layerable, blendable way with history—by the content of Input Text (e.g. key words or sentiments) affecting the internal state of the Embodied Agent so that emotions linger, and blend appropriately.

In one embodiment, words may be decomposed into two or more underlying emotions. For example, the word "marvellous" can be both construed as "surprising" and "happy", and "horrified" can be decomposed into "fear"+"disgust". In one embodiment two or more "emotion dictionaries" each contain lists of words representing elements of a particular emotion. Words or tokens are matched against the emotion dictionaries to determine which component emotions apply to the words or tokens.

In one embodiment, each word matched in an emotion dictionary may also be paired with a dictionary match variable representing the degree to which the word is relevant to the emotional dictionary. For example, a "fear" dictionary may contain words with corresponding dictionary match variables as follows: horrifying 0.9, disaster 0.92, scary 0.8, uncomfortable 0.6. Both the matched emotions as well as dictionary match variables may be returned and provided as input to the emotion system. This provides a way of responding to complex, compound emotions in a compositional, blendable and transitional way.

Emphasis Detection

An Emphasis Detection algorithm determines the importance of words in a Communicative Utterance, enabling an Embodied Agent to emphasise the most important words with gestures. A Emphasis Detection Algorithm may identify key words according to certain criteria. In one embodiment, the Emphasis Detection Algorithm identifies which words in each clause will be given a strong, medium, low, or no emphasis.

Figures 2, 3:
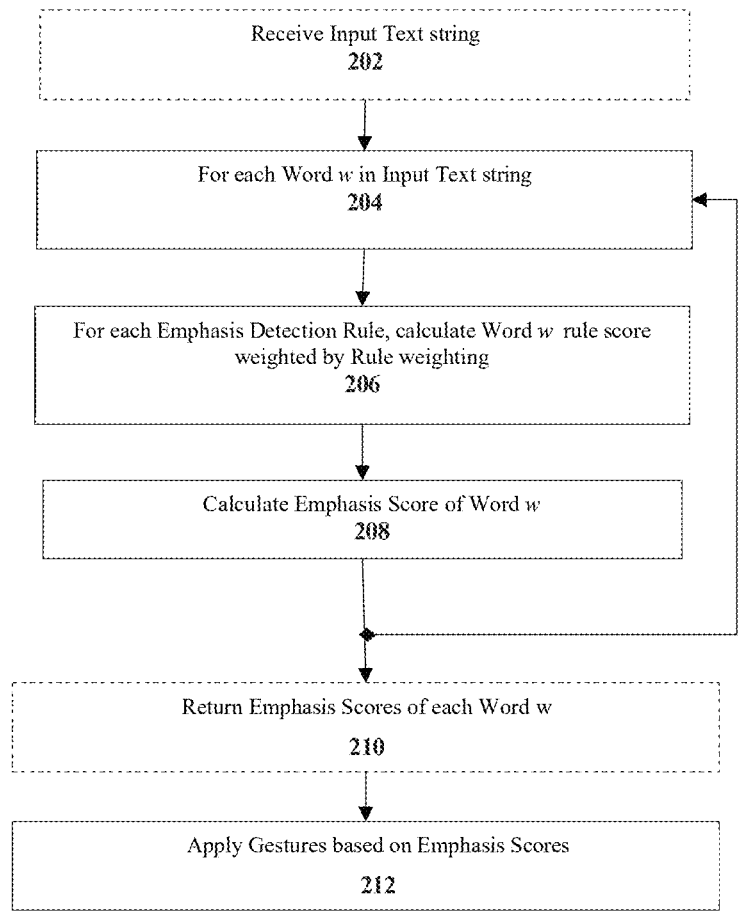
FIG. 2 shows a Emphasis Detection algorithm according to one embodiment.
FIG. 3 shows an example of suitable rules weightings for Emphasis Detection.

FIG. 2 shows a Emphasis Detection algorithm according to one embodiment. At step 202, an Input Text is received. At step 204, for each "token" or word w in the Input Text, each Emphasis Detection rule is applied. Calculation of the word score may include the application of several rules. At step 206, for each Emphasis Detection Rule, a rule score is calculated for the relevant token or word. Emphasis Detection rules may be weighted such that some rules have greater influence on the word score than others. At step 208, an overall Emphasis Score for the token or word is calculated. At step 210, the Emphasis Scores for each rule are returned. The Emphasis Scores for the words are then used to apply Gestures based on the Emphasis Scores In one embodiment, the Emphasis Detection algorithm looks up the rareness of each word. A look-up table of words and associated "frequencies" (of use of that word in a particular language or context) may be used to return word rareness for each word.

Words with relatively higher Emphasis Scores may "trigger a "beat", which is a type of gesture which does not carry any speech content, but conveys non-narrative content and aligns with the rhythm of speech. The Emphasis Detection recognises the parameters in which the keyword has been defined to activate rules.

A "weight" or intensity may range between of 0-1. Weights are specified for each rule. Weights may be applied in two ways: "weight" per rule and "weight" per word.

The weight of the rule remains a constant e.g. the sentiment rule is always weighted at a value of 0.8. Meanwhile a keyword will be weighted depending on its stated value within the corresponding dictionary e.g. I am very excited (listed as 0.7 in the sentiment dictionary).

Multiple keywords may be identified in a given sentence and emphasized with beat gestures accordingly. In one embodiment, the Emphasis Detection algorithm identifies keywords in a given clause, and assigns all words high, medium, low or no emphasis based on the weighted keyword identification algorithm. Scores are calculated for all words in a sentence, then sorted in descending order. The top 10% are defined as strong beats, following 10% as medium beats, another following 10% as low beats. Any suitable thresholds may be provided to categorize beats as strong, medium and/or low.

Beat Gestures may be applied to the stressed syllable such that the stroke of the beat is in sync with the stressed syllable in a word.

Rules may be combined in any suitable manner, including summing or finding the MAX. One example of suitable rules weightings is shown in FIG. 3. FIG. 4 shows an example of the application of rules to the input text "John loves snorkelling in Greece".

Emphasis Detection Fine-Tuning

The weights for the Emphasis Detection rules may be fine-tuned using, for example, a greedy algorithm or a deep learning model, on human-annotated data. A collection of sentences (preferably over 1500), covering various semantic domains are selected as a training dataset. Human annotators manually select the keywords (emphasis words) for each sentence. In total 3540 sentences are used as training dataset. In one embodiment, a plurality of annotators are used, and the conformity of their annotation decisions may be measured. In one experiment, the applicants found that two human annotators agreed on 71.44% of emphasized words. The annotations from all annotators may be used at the same time to avoid overfitting to single annotation.

In one embodiment, the weights are fine-tuned using a greedy algorithm. A greedy algorithm is used to tweak the weights to obtain maximum accuracy on training data. All weights are initialised randomly. At each iteration, all weights are fixed except for one randomly chosen. It will be tuned by searching in a 0.01 precision within [0,1] to maximize the accuracy of training data. The algorithm terminates after 10 k iterations.

In another embodiment, a deep neural network is used to train the weights. A 1-layer fully connected feedforward network without bias or activation is used from Keras to find the weights.

Advantages

The TTG System creates impressions of different personalities by varying the gesturing style of a Embodied Agent. The TTG System is highly configurable. A person with an understanding of personality and body language, for example a film director, can use this system to create different realistic behaviours in Embodied Agents. The person can choose the set of gestures used, for example palm up vs palm down. They can also adjust the speed, rates, size and location of their gesturing. They can specify how emotionally expressive the agent is, by configuring how the gestures get affected by the sentiment of the sentence. All of the above aspects influence the perceived personality of the agent.

An Action and Pose scheme is used to generate a large variety of gestures efficiently, in a manner requiring less computational storage space. The Action and Pose scheme also saves animator time as a large set of animations may be generated automatically using the Action and Pose scheme without requiring all variations to be manually crafted by an animator.

The system identifies the gesture types most commonly used in dialogs, including:

Symbolic gestures (iconic, metaphoric, emblematic)—Identified based on string-matching and dictionaries. E.g., tracing a square for the word "square"; using up gesture for "higher".

Dialogue Act gestures—Identified by our rules based on Linguistics. E.g., small shrug and open palm arc outward for question; head shake and dismissive flick of wrist for negation; pointing left and then right on "this or that" in "you can have this or that"

Emphasizing gestures—Identified using keywords detection. E.g., applying a beat gesture to "really" in "this is really bad"

Embodiment gestures—E.g., looking up and to one side and furrowing brow and then looking back as if to be retrieving the term "constructivist epistemology"; shifting weight from one foot to the other between clauses Turn-taking gestures—E.g., looking away between clauses when not finished (retaining conversational floor), looking directly at user and smiling when finished (ceding conversational floor)

The TTG System results in more human-like autonomous animation because the TTG System derives linguistic information from Input Text which helps inform animation. The TTG System detects negations based on the relationships between words in the dependency tree that represents the sentence. The TTG System detects enumerating behaviours by finding noun phrases, verb phrases, and other patterns in the part of speech of words.

Variation Poses introduce natural looking randomness to the gestures.

Affective Response Modulation in Embodied Agents

Inventions disclosed herein provide a Mapping Matrix for multidimensional affective and/or emotional mapping operations, adapting the reaction to affective stimuli (which may be external or internal) to portray desired personality traits and/or temperament, or fit specific use cases. Multidimensional affective and/or emotional mapping operations may thus serve to modulate or provide additional inputs to be weighed in driving a behavioural simulation of an embodied agent, as described above.

An affective response system for autonomous agents creates a configurable mapping from perceived emotions from stimuli to appropriate response emotions as part of an empathetic autonomously animated system. The capacity to configure the empathetic response allows for the easy and intuitive creation of different styles of response to convey desired personality traits and tailor the emotional performance to specific use-cases. The parameters that describe the empathetic response can be modified dynamically to simulate mood swings or changes in the state of mind. The input emotions can come from any emotion classification system including but not limited to an NLP system or facial emotional analysis system. The outputs can be used to drive verbal or nonverbal behaviors. This mapping is determined by one or more matrix operations, which may use a predefined Mapping Matrix (or plurality thereof). In one embodiment, the Mapping Matrix, comprises a matrix of weights, each vertical column corresponding to one per-output-emotion scalar intensities. The dimensions of the matrix are determined by the number of available input and desired output emotions.

FIG. 9 shows an affective response system. A Detection System 906 detects and/or processes input stimuli to determine Input Affect Activations. A Mapping System 907 includes a Mapping Matrix 905 which may be configured (for example, to correspond to a particular personality) using a Configuration System 908. Input Affect Activations are processed by the Mapping Matrix 905 to generate Output Affect Activations 904. Elements of the Mapping Matrix represent transformations to be applied to corresponding Input Affect Activations. Output Affect Activations 904 are then used to animate the Agent 1. Output Affect Activation 904 may contribute to Neuron Activations 910, which drive the Expression 911 of the Agent 1.

Understanding the overall effect of the emotional configuration when it's distributed throughout a codebase may be very challenging. Configurable Empathetic Response to External Emotional Stimuli solves or at least reduces the problem of emotion models being configured by a distributed set of constants. As the development of personality, behavior styles, characteristic emotional responses available to an Agent expands, extracting the configuration of the emotional model from the core codebase allows for multiple versions to co-exist and for easy swapping between versions in real-time.

The Detection System 906 may determine Input Affect Activations from any suitable source, in any suitable manner. Inputs or stimuli may originate from real-world stimuli comprising for example an input from one or more of a camera, electromagnetic transducer, audio transducer, keyboard or other known systems. Other stimuli include graphical user interfaces, hardware consoles, streamed data, and data from cloud computers, computer indexes, the world-wide web or a variety of sensors.

Figures 11, 12, 13:
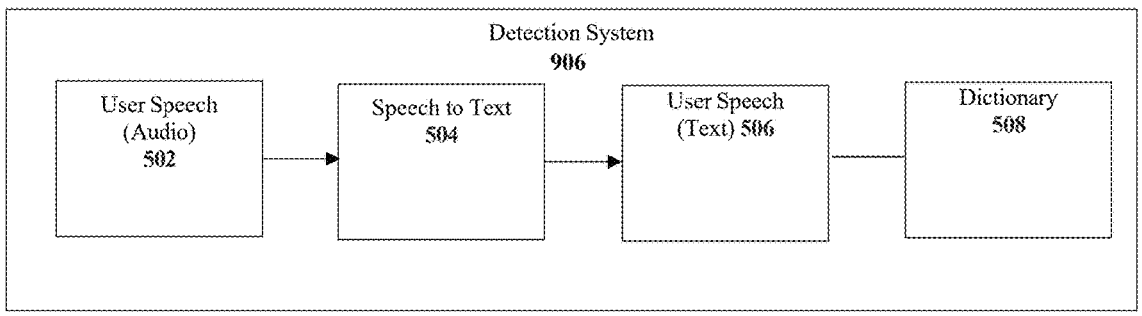
FIG. 11 shows a Mapping Matrix.
FIG. 12 shows an example JSON implementation of a Mapping Matrix
FIG. 13 shows an example of a Detection System.
Figures 14, 15:
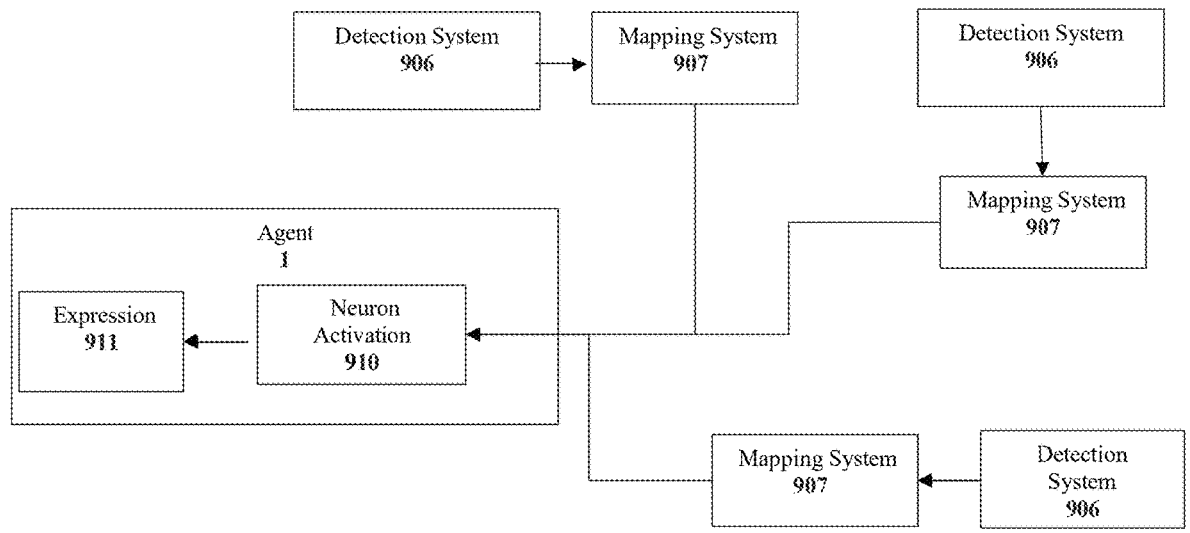
FIG. 14 shows an example of a Dictionary.
FIG. 15 shows an affective response system with multiple Mapping Systems.

In one embodiment, the Input Affect Activations reflect Affects detected from user input from a user interacting with the virtual character, digital entity, or robot. The method may receive, from the user via a microphone of an electronic device of the user, speech input from the user. FIG. 13 shows an example of a Detection System 906 configured to determine Input Affect Activations from a user's affect, based on the speech of a User conversing with the Agent. At 502, audio of user speech, captured via the user's microphone is received and passed to a speech to text system 504. The speech to text system 504 converts the audio to user speech in text (506). The text 506 is compared against one or more dictionaries 508, each of which is associated with an emotional/affective dimension, which match key word/s in the text to affective categories. FIG. 10 shows an example of a Dictionary associated with positive sentiment. Where a match is found in an emotional/affective dictionary, the input Affect corresponding with that emotional/affective dimension is set to 1.0 and then passed into the emotional model which applies the Affect Mapping Matrices to the input Affects. Alternatives to dictionary-based emotional detection include rule-based NLP methods, SVM sentiment valence detection, machine-learning based models of emotional classification/sentiment analysis.

Other sources of user emotional input may derive from user utterances, user voice (e.g. vocal tone), user facial expression, user body language. The ambience of a user's environment may also provide Input Affect Activations—for example, lighting conditions, or objects detected in a user's background.

In other embodiments, Input Affect Activations may be determined from content (e.g. digital content), such as video content, imagery, audio, or any other suitable content. Where content is associated with metadata available to the affective response system, content metadata may be used to determine Input Affect Activations. For example, the keywords associated with Images having Alt text may be compared against a dictionary as described above, or affective qualities of the Alt Text may be determined using SVM sentiment valence detection or other methods of emotional classification/sentiment analysis.

Where the Agent may be receiving input from multiple users (either from the same end-user input devices, or independent end-user input devices) an average or interpolated Input Affect Activation may be determined from the multi-user input.

Audio sources such as music, background noises, speech, or other sounds may contribute to Input Affect Activations. Where audio comprises music, any suitable music emotion recognition method may be used to determine Input Affect Activations of the music. For example Lu, L., Liu, D., and Zhang, H. J. (2006). Automatic mood detection and tracking of music audio signals. IEEE Trans. Audio Speech Lang. Process. 14, 5-18. Discloses a Gaussian mixture model (GMM) and Bayesian classifier to classify music emotions.

User symbolic gestures including but not limited to deictic and iconic gestures, and sign language may be classified accordingly and influence and/or set Input Affect Activations.

In another embodiment, input stimuli may originate from the Agent's system and/or be associated with the agent. For example, where the Agent is autonomously animated with a behavioural/neurobehavioural model, parameters of the Agent's own internal state can be a source of Input Affect Activations. In agents configured with a model of attention, the Avatar's attentional state can be a source of Input Affect Activations. For agents with memories, knowledge or preferences, the memories, knowledge or preferences can influence Input Affect Activations. In conversational agents, the conversational utterances of the Agent may be processed using any suitable method to determine affective qualities for Input Affect Activations. Conversational utterances of Agents may be provided by any suitable dialogue system such as IBM Watson or Google Dialogflow. For agents simulated in a virtual environment, aspects of the Avatar's environment can be a source of Input Affect Activations.

FIG. 11 shows an Affect Mapping Matrix according to one embodiment. Each column corresponds to the response to an input Affect. The output Affect response profile is determined by that row's weights. FIG. 10 shows an example implementation of a Mapping Matrix for personality-based emotion mapping ("Weight Matrix"), wherein the Mapping Matrix is defined using JSON. The Weight Matrix contains eight input emotions (anger, concern, disgust, fear, sad, happy, surprise, and interest). Each input emotion has a set of output emotion weights. For example, the emotional output when anger is detected in the input is comprised of anger, concern, fear, shame, and negative joy. The negative weight for joy is used to remove any lingering activations from previous emotions. This improves the speed, clarity, and appropriateness of responses. Every weight not explicitly set in the JSON configuration is set to 0 by default. Each row of the Mapping Matrix represents the response each input emotion will elicit. For example, an Input Affect Activation of "anger": {"anger": 0.3, "joy": —0.5} will cause a small spike in output Affect anger and a larger negative spike in output Affect joy.

FIG. 12 shows an example implementation of a Mapping Matrix for personality-based emotion intensity configuration ("Intensity Matrix"). The intensities may conveniently support scaling elements of the emotional response. This is one way to create subtle variation between, for example, a mildly happy and an extremely happy personality. The base weight matrices could be identical and just change the intensity of 'joy'. Whilst this invention describes a "Matrix", in some embodiments, mathematically equivalent objects to Matrices may replace the Affective Mapping Matrix, such as collections of vectors, systems of linear equations or graphs.

Any suitable set affect categories may be defined. In the example shown in FIG. 11, Input Affect Activations include the discrete affective categories of Anger, concern, disgust, fear, sadness, happiness, surprise and interest. Output emotion categories are anger, concern, disgust, fear, sadness, joy, surprise, interest, shame, care and excitement. The set of Input Affect Activations may (but do not necessarily) need to correspond to Output Affect Activations.

In one embodiment, Input Affect Activations (or input affects) are a matrix/vector of binary values, however the invention is not limited in this respect. Input Affect Activations may be weighted and may comprise continuous (as opposed to binary) positive/negative values associated with each affect/emotion dimension. Input Affect Activations may represent the emotional/affective contributions for each emotion/affect from a plurality of emotional/affective dimensions or categories. For example, given the three emotional dimensions [happy, sad, angry], an input affect activation of [0,0,1] represents a fully "angry" input affect activation and an input affect activation of [0,0.5,0.5] may represent an equally sad and equally angry input affect activation.

In one embodiment, Mapping Matrix values are populated from a Configuration System. In one embodiment, the Configuration System includes a "configuration file" defining a set of Mapping Matrices, each corresponding to a personality, and the Mapping Matrix values are replaced with those defined by the selected personality.

In other embodiments, the Configuration System may include functions for dynamically varying Mapping Matrix parameters, according to certain hyper-parameters. Matrix variables could be trained via a machine learning method, wherein the training data are emotional inputs and responses from participants in human-to-human interactions.

Multiple matrix operations may be applied sequentially or in parallel to Input Affect Activations to generate Output Affect Activations. In one embodiment, Multiple matrix operations may be applied for a plurality of Input Affect Activations from the multiple sources. For example, a first matrix for user speech, and a second matrix for user facial emotions.

A plurality of matrix operations (e.g. sequential operations) may be implemented programmatically, in particular, matrix multiplication and application of per emotion scalar intensities, e.g.:

outputEmotions=weightMatrix*inputEmotions outputEmotions[1]=outputEmotions[1]*intensities[1]

Input_emotions is of dimension [n×1], weight_matrix is of dimension [m×n], and output emotions is of dimension [m×1], where n=num_input_emotions and m=num_output_emotions]. For example, after the personality-based emotion mapping using the Mapping Matrix for personality-based emotion mapping (shown in FIG. 11), the output from that operation is scaled by its corresponding intensity using the Mapping Matrix for personality-based emotion intensity configuration (FIG. 12). The equation comprising inputs i, Weights W, intensities b may be defined as follows to produce outputs y:

$$Y_i=(W_x)_i*b_i$$

In FIG. 12 the intensities vector lists the available output emotions and their corresponding intensities. The output Affects are produced by scaling the product of all previous matrix operations by their corresponding intensity. This can be used to enhance the characteristic emotional responses. The example weight matrix and intensities vector in FIG. 11 matrix values are configured to convey a general use, balanced, appropriate, empathetic response, configured to fill in the social role of a polite acquaintance, perhaps in a customer service type role. Each input emotion is acknowledged and modulated to show that some processing has been done prior to responding. For example, the response to 'anger', is mostly concern and joy negation, with some additional anger, fear, and a tiny amount of shame. In this use case, it would not be socially acceptable to get angry back at a user if they were getting angry. Some other options could be to have predominantly fear and sad, for more of a timid personality, happy and disgust for a more sassy and rude personality, or something more subtle. Depending on the situation and goal of the interaction, different response compositions will be appropriate.

Configuring the matrix and intensities to convey personality traits is reasonably simple, as it can be done by changing Mapping Matrix values. The equation used to calculate output Affects need not be linear as in the example above, it could be any linear or non-linear equation applying the Mapping Matrices to the input Affects.

Mapping matrices configured for various personalities/temperaments can be interpolated. For example, given Matrix A, representing a first personality profile [e.g. shy], and Matrix B, representing a second personality [e.g. ambitious]— an interpolation between Matrix A and Matrix B can be given by the matrix operation:

$$\alpha A+(1-\alpha)B$$

Where $\alpha$ is the interpolation parameter. In general M matrices could be interpolated between with N-1 interpolation parameters, all of which sum to 1, or alternatively by statistical methods. Matrices can be temporarily interpolated to simulate mood swings or changes to empathetic behaviour due to other physical or physiological stimuli. Alternatively, a user-friendly method of precise personality configuration can be provided by allowing users to finely interpolate between any personality profile, as determined by a personality matrix.

Matrix interpolation can be done through linear blending on the matrices directly or logarithmic transform of the matrices (i.e. interpolating in Lie Subgroups). Conversely, the matrices can be projected onto a latent space using techniques such as Principal Component Analysis, Linear Discriminant Analysis, Autoencoder etc, where interpolation can be performed on the latent variables.

An identity matrix could be used to create direct mimicry. This can be used to create a simple, primary/emotional empathy system where the output Affects are identical to the input Affects. The identity matrix could be interpolated with another matrix to provide degrees of mimicry.

The Mapping Matrix defines the empathetic response to external stimuli, and therefore variations of the Mapping Matrix can be created to mimic different personalities and temperaments. In addition, these mapping matrices can be created as a function of output emotion or mood, resulting in a dynamic feedback system that simulates homeostatic regulation. This homeostatic regulation can be implemented by concatenating the output emotion vector from the previous evaluation step onto the current input emotion vector and therefore expend the dimensionality of the Mapping Matrix.

The parameters of the Mapping Matrix may be changed in real time based on the internal state of the agent or certain external stimuli. On top of linear Multiplication of the input emotion value by the Mapping Matrix, nonlinearity can be introduced by cascading multiple Mapping Matrices, where each weight Matrix defines the response from one external stimuli (such as user's speech, user's facial expressions etc.). In addition, a leaky integrator inspired by a biological neuron model can be used to manipulate the Mapping Matrix where the elements of the Mapping Matrix will update due to other external stimuli such as ambient sound (e.g. loud noise). In this implementation, the external stimuli are introduced as input voltages whereas the output voltage corresponds to the Element values of the Mapping Matrix. When the stimuli go away, the Elements of the Mapping Matrix would return to the resting state. Neural networks or statistical regressions could also be used here where the Elements of the Mapping Matrices are trained on data collected from human social interactions.

A user interface may be provide, enabling a user to adjust values of the agent. The user interface may allow the user to adjust parameters in real-time and see the behaviour reflected in the agent in real-time. An audio-visual user interface may be provided for customizing the agent based on a spoken conversation between a user and the agent. Accordingly, this aspect of the invention departs from the known approach to provide, and possibly overwhelm, the user with several user interface control elements in the form of buttons, sliders and the like, to customize an agent. Instead, the described aspect of the invention provides an audio-visual interface which allows the user and the agent to conduct a spoken conversation during the customization process. This way, the user can be guided through the customization process by way of the agent conversing with the user. This enables the user to create the desired affective/emotional/behavioural profile of the agent in a faster and more intuitive manner, allowing the user to focus on creativity without being overwhelmed by a complex graphical user interface. In other words, this aspect of the invention assists the user in performing the technical task of generating a realistic, autonomously animated agent by means of a continued and guided human-machine interaction process.

Certain embodiments use natural language processing (NLP) techniques to understand the intent of the user and to drive matrix configurations through these intents. A combination of NLP and/or regular expression matching may be used to extract the user's matrix modification intent. The method may also display a selection of possible modifications to drive the discussion. The method advises the user when a requested feature modification is outside a defined range. The agent's questions and responses to the user may be generated using NLP or other similar techniques.

When the user makes a customization request, the NLP model identifies emotions and the corresponding personality modifications and triggers a change in at least one of the Affect Mapping Matrices whereby at least one of the output Affects is changed. For example, if the user says: "Be less aggressive", The emotional dimension associated with "anger" may be identified, and the linear multiplier of the output Affect anger from one or more of the Affect Mapping Matrices could be decreased. The script will then execute those orders and generate an agent with the corresponding Matrix values adjusted to reflect the user's request.

Certain embodiments have been described which provide an intuitive way to customize a digital agent's behaviour by letting the user describe the features of the agent and the desired customization options. Certain embodiments provide a framework which guides the creative process in an interactive manner, which makes the agent creation accessible to non-professional communities.

In another aspect of the invention, the method comprises the step of determining whether the customization request meets one or more customization constraints, and the step of customizing the agent in accordance with the customization request if, preferably only if, the one or more customization constraints are met. Accordingly, this aspect ensures Mapping Matrix values can be customized only within certain predefined reasonable boundaries, which reduces the likelihood of creating inadequate or implausible animation/behaviour.

In one embodiment, the invention provides a computer-implemented method for automatically generating Affective expression of a virtual character, digital entity, or robot, comprising: receiving input Affect activations for at least one source, for a plurality of Affect categories; using input Affect activations and at least one Mapping Matrix in at least one matrix operation to generate output Affect activations, wherein elements of the Mapping Matrix represent transformations to be applied to corresponding input Affect Activations; and generating at least one Affective expression for the virtual character, digital entity, or robot, wherein the Affective expression is influenced by and/or determined by the output Affect activations. The non-zero elements of at least one Affect Mapping Matrix may represent linear multipliers on input Affect activations. Optionally, output Affect activations activate neurons of a neurobehavioural model of the virtual character, digital entity, or robot to drive at least one Affective expression.

There may be provided at least two mapping matrices, wherein in a first matrix operation, a first mapping matrix is an affect mapping matrix representing linear multipliers on input Affect activations, and in a second mapping operation, a second mapping matrix is an intensity mapping matrix scaling the result of the first matrix operation. Mapping Matrix elements may be variables, which may be set by a user. Variables may be set by a user conversing in natural language with the virtual character, digital entity, or robot via an audio-visual interface. Variables may be trained via a machine learning method. Variables may be adjusted during live operation of the virtual character, digital entity, or robot.

In one embodiment, the Mapping Matrix is selected from a plurality of predefined Affect Mapping Matrixes, wherein each predefined Affect Mapping Matrix is configured for a personality or temperament of the virtual character, digital entity, or robot.

The Mapping Matrix may be an interpolation between a plurality of predefined Affect Mapping Matrixes, wherein each predefined Affect Mapping Matrix is configured for a personality or temperament of the virtual character, digital entity, or robot. The source of input Affect activations may be at least one user interacting with the virtual character, digital entity, or robot, or the virtual character, digital entity, or robot itself. Input Affect activations may reflect Affects detected from one or more of: user utterances; user voice; user facial expression; user body language and user environment. Affect activations may reflect Affects detected from one or more of: behavioural state parameters; attentional parameters; conversation; and environment of the virtual character, digital entity, or robot.

The methods and systems described may be utilised on any suitable electronic computing system. According to the embodiments described below, an electronic computing system utilises the methodology of the invention using various modules and engines. The electronic computing system may include at least one processor, one or more memory devices or an interface for connection to one or more memory devices, input and output interfaces for connection to external devices in order to enable the system to receive and operate upon instructions from one or more users or external systems, a data bus for internal and external communications between the various components, and a suitable power supply. Further, the electronic computing system may include one or more communication devices (wired or wireless) for communicating with external and internal devices, and one or more input/output devices, such as a display, pointing device, keyboard or printing device. The processor is arranged to perform the steps of a program stored as program instructions within the memory device. The program instructions enable the various methods of performing the invention as described herein to be performed. The program instructions, may be developed or implemented using any suitable software programming language and toolkit, such as, for example, a C-based language and compiler. Further, the program instructions may be stored in any suitable manner such that they can be transferred to the memory device or read by the processor, such as, for example, being stored on a computer readable medium. The computer readable medium may be any suitable medium for tangibly storing the program instructions, such as, for example, solid state memory, magnetic tape, a compact disc (CD-ROM or CD-R/W), memory card, flash memory, optical disc, magnetic disc or any other suitable computer readable medium. The electronic computing system is arranged to be in communication with data storage systems or devices (for example, external data storage systems or devices) in order to retrieve the relevant data. It will be understood that the system herein described includes one or more elements that are arranged to perform the various functions and methods as described herein. The embodiments herein described are aimed at providing the reader with examples of how various modules and/or engines that make up the elements of the system may be interconnected to enable the functions to be implemented. Further, the embodiments of the description explain, in system related detail, how the steps of the herein described method may be performed. The conceptual diagrams are provided to indicate to the reader how the various data elements are processed at different stages by the various different modules and/or engines. It will be understood that the arrangement and construction of the modules or engines may be adapted accordingly depending on system and user requirements so that various functions may be performed by different modules or engines to those described herein, and that certain modules or engines may be combined into single modules or engines. It will be understood that the modules and/or engines described may be implemented and provided with instructions using any suitable form of technology. For example, the modules or engines may be implemented or created using any suitable software code written in any suitable language, where the code is then compiled to produce an executable program that may be run on any suitable computing system. Alternatively, or in conjunction with the executable program, the modules or engines may be implemented using, any suitable mixture of hardware, firmware and software. For example, portions of the modules may be implemented using an application specific integrated circuit (ASIC), a system-on-a-chip (SoC), field programmable gate arrays (FPGA) or any other suitable adaptable or programmable processing device. The methods described herein may be implemented using a general-purpose computing system specifically programmed to perform the described steps. Alternatively, the methods described herein may be implemented using a specific electronic computer system such as a data sorting and visualisation computer, a database query computer, a graphical analysis computer, a data analysis computer, a manufacturing data analysis computer, a business intelligence computer, an artificial intelligence computer system etc., where the computer has been specifically adapted to perform the described steps on specific data captured from an environment associated with a particular field.

The invention claimed is:

1. A method of animating a virtual character or digital entity, including the steps of:
    receiving Input Text specifying words to be spoken by the virtual character or digital entity;
    determining an emphasis score of each word in the Input Text;
    determining a set of words with higher emphasis score compared to the remaining words in the Input Text; and
    animating a virtual character or digital entity to speak the Input Text and applying a gesture to each word from the set of words with higher emphasis score; and
    wherein at least one of:
    (a) the gesture is applied to a stressed syllable of each word from the set of words with the higher emphasis score;
    (b) the emphasis score is based on word rarity, wherein frequencies of words determine the word rarity;
    (c) wherein the gesture applied to each word from the set of words has a gesture amplitude proportional or substantially proportional to the emphasis score of the word; and/or
    (d) wherein the emphasis score is calculated by applying a set of criteria to determine the emphasis score of each word, wherein a contribution of each criterion to the emphasis score is weighted using a weighting.

2. The method of claim 1 wherein the gesture is a beat gesture.

3. The method of claim 1 wherein the set of words with relatively higher emphasis score comprises words from the Input Text with an emphasis score within a predefined top percentile of all words in the Input Text.

4. The method of claim 1, wherein the set of criteria are selected from the group consisting of: word sentiment, part of speech, capitalization, negation and rarity.

5. A system for animating a virtual character or digital entity, the system including:
    input-receiving means for receiving Input Text;
    a plurality of gestures, wherein each gesture is associated with:
        an animation;
        at least one configurable parameter for varying the animation; and
        a configuration range of the configurable parameter;
    an animation generator, wherein the animation generator is configured to:
        analyse Input Text to determine at least one gesture;
        determine a configuration of the configurable parameter from the configuration range; and
        animate the virtual character or digital entity with the animation as varied by the configurable parameter,
    wherein each gesture is associated with at least one modulatory variable for modulating the configuration range of the configuration parameter, and wherein the animation generator is configured to determine a configuration of the configurable parameter as modified by the modulatory variable, and
    wherein at least one of:
    (a) determining a configuration of the configurable parameter from the configuration range is randomly determined; and/or
    (b) configurable parameters are selected from the group consisting of: gesture speed, gesture amplitude and gesture pose.

6. A system for animating a virtual character or digital entity, the system including:
a processor;
a plurality of gestures, wherein each gesture is associated with:
an animation;
at least one configurable parameter for varying the animation; and
a configuration range of the configurable parameter;
an animation generator, wherein the animation generator is configured to:
analyse, with the processor, Input Text to determine at least one gesture;
determine a configuration of the configurable parameter from the configuration range; and
animate the virtual character or digital entity with the animation as varied by the configurable parameter,
wherein each gesture is associated with at least one modulatory variable for modulating the configuration range of the configuration parameter, and wherein the animation generator is configured to determine a configuration of the configurable parameter as modified by the modulatory variable, and
wherein at least one of:
(a) determining a configuration of the configurable parameter from the configuration range is randomly determined; and/or
(b) configurable parameters are selected from the group consisting of: gesture speed, gesture amplitude and gesture pose.

* * * * *